United States Patent
Mnih et al.

(10) Patent No.: US 11,062,229 B1
(45) Date of Patent: Jul. 13, 2021

(54) TRAINING LATENT VARIABLE MACHINE LEARNING MODELS USING MULTI-SAMPLE OBJECTIVES

(71) Applicant: DeepMind Technologies Limited, London (GB)

(72) Inventors: Andriy Mnih, London (GB); Danilo Jimenez Rezende, London (GB)

(73) Assignee: DeepMind Technologies Limited, London (GB)

( * ) Notice: Subject to any disclaimer, the term of this patent is extended or adjusted under 35 U.S.C. 154(b) by 1080 days.

(21) Appl. No.: 15/438,436

(22) Filed: Feb. 21, 2017

Related U.S. Application Data

(60) Provisional application No. 62/297,094, filed on Feb. 18, 2016.

(51) Int. Cl.
    *G06N 20/00* (2019.01)
    *G06F 17/11* (2006.01)

(52) U.S. Cl.
    CPC ............ *G06N 20/00* (2019.01); *G06F 17/11* (2013.01)

(58) Field of Classification Search
    CPC ..................................... G06N 20/00
    USPC ............................................ 706/12
    See application file for complete search history.

(56) References Cited

U.S. PATENT DOCUMENTS

| | | | | |
|---|---|---|---|---|
| 5,564,115 A * | 10/1996 | Clarkson | ........ | G06N 3/063 706/28 |
| 7,953,676 B2 * | 5/2011 | Agarwal | ........ | G06Q 10/04 706/12 |
| 9,858,529 B2 * | 1/2018 | Adams | ........ | G06N 7/005 |
| 2002/0091655 A1 * | 7/2002 | Agrafiotis | ........ | G06K 9/6232 706/26 |
| 2011/0010319 A1 * | 1/2011 | Harada | ........ | G06K 9/00664 706/12 |

(Continued)

FOREIGN PATENT DOCUMENTS

WO WO-2009067655 A2 * 5/2009 ............ G16B 40/00

OTHER PUBLICATIONS

"Normal Distribution", NIST/SEMATECH e-Handbook of Statistical Methods, Jan. 12, 2013, NIST, Section 1.3.6.6.1, accessed online Mar. 7, 2020 at <https://web.archive.org/web/20130112092122/https://www.itl.nist.gov/div898/handbook/eda/section3/eda3661.htm> (Year: 2013).*

(Continued)

*Primary Examiner* — James D. Rutten
(74) *Attorney, Agent, or Firm* — Fish & Richardson P.C.

(57) ABSTRACT

Methods, systems, and apparatus, including computer programs encoded on a computer storage medium, for training a machine learning model. One of the methods includes, for each training observation: determining a plurality of latent variable value configurations, each latent variable value configuration being a combination of latent variable values that includes a respective value for each of the latent variables; determining, for each of the plurality of latent variable value configurations, a respective local learning signal that is minimally dependent on each of the other latent variable value configurations in the plurality of latent variable value configurations; determining an unbiased estimate of a gradient of the objective function using the local learning signals; and updating current values of the parameters of the machine learning model using the unbiased estimate of the gradient.

20 Claims, 3 Drawing Sheets

(56) References Cited

U.S. PATENT DOCUMENTS

2011/0307437 A1* 12/2011 Aliferis ............ G06N 20/00 706/52
2017/0193049 A1* 7/2017 Grehant ............ G06F 16/22

OTHER PUBLICATIONS

Anandkumar et al., Tensor Decompositions for Learning Latent Variable Models, Aug. 2014, Journal of Machine Learning Research, vol. 15, pp. 2773-2832 (Year: 2014).*

Titsias et al., Local expectation gradients for black box variational inference, In Advances in Neural Information Processing Systems, pp. 2638-2646, 2015 (Year: 2015).*

Halbersberg, D., & Lerner, B. (2020). Local to global learning of a latent dynamic Bayesian network. In 24th European conference on artificial intelligence—ECAI 2020. Santiago de Compostela, Spain: IOS Press. (Year: 2020).*

Ba et al. "Learning wake-sleep recurrent attention models," Advances in Neural Information Processing Systems, 2015, 9 pages.

Bornschein et al. "Importance weighted autoencoders," arXiv preprint arXiv 1509.00519, Sep. 1, 2015, 14 pages.

Dauphin et al. "Predicting distributions with linearizing belief networks," arXiv preprint arXiv 1511.05622, Nov. 17, 2015, 14 pages.

Gregor et al. "Draw: a recurrent neural network for image generation," arXiv preprint arXiv 1502.04623, Feb. 16, 2015, 10 pages.

Gu et al. "MuProp: Unbiased backpropagation for stochastic neural networks," arXiv preprint arXiv: 1511.05176, Nov. 16, 2015, 12 pages.

Hinton et al. "The "wake-sleep" algorithm for unsupervised neural networks," Science 268(5214), May 1995, 11 pages.

Jordan et al. "An introduction to variational methods for graphical models," Machine Learning 37(2), Nov. 1, 1999, 51 pages.

Kingma et al. "Adam: A method for stochastic optimization," arXiv preprint arXiv1412.6980v9, Dec. 22, 2014, 9 pages.

Kingma et al. "Auto-encoding variational bayes," arXiv preprint arXiv 1312.6114v10, May 1, 2014, 14 pages.

Mnih et al "Neural variational inference and learning in belief networks," arXiv preprint arXiv 1402.0030v2, Jun. 4, 2014, 10 pages.

Mnih et al "Recurrent models of visual attention," Advances in Neural Information Processing Systems, 2014, 9 pages.

Neal. "Connectionist learning of belief networks," Artificial intelligence 56(1), Jul. 1, 1992, 43 pages.

Raiko et al. Techniques for learning binary stochastic feedforward neural networks, arXiv preprint arXiv 1406.2989v3, Apr. 9, 2015, 10 pages.

Ranganath et al. "Black box variational inference," AISTATS, Oct. 2015, 9 pages.

Rezende et al. "Variational inference with normalizing flows," arXiv preprint arXiv 1505.05770v6, Jun. 14, 2016, 10 pages.

Rezende et al. "Stochastic backpropagation and approximate inference in deep generative models," arXiv preprint arXiv1401.4082v3 May 30, 2014, 14 pages.

Salakhutdinov et al. "On the quantitative analysis of Deep Belief Networks," Proceedings of the $25^{th}$ Annual International Conference on Machine Learning, ACM, Jul. 5, 2008, 8 pages.

Salimans et al. "Markov chain monte carlo and variational inference: Bridging the gap," Proceedings of the $32^{nd}$ International Conference on Machine Learning, vol. 37, 2015, 9 pages.

Sohn et al. "Learning structured output representation using deep conditional generative models," Advances in Neural Information Processing Systems, 2015, 9 pages.

Tang et al. "Learning stochastic feedforward neural networks," Advances in Neural Information Processing Systems, 2013, 9 pages.

Titsias et al."Local expectation gradients for black box variational inference," Advances in Neural Information Processing Systems, 2015, 9 pages.

Zaremba et al. "Reinforcement learning neural Turing machines," arXiv preprint arXiv:1505.00521v1, May 4, 2015, 13 pages.

* cited by examiner

TRAINING LATENT VARIABLE MACHINE LEARNING MODELS USING MULTI-SAMPLE OBJECTIVES

CROSS-REFERENCE TO RELATED APPLICATION

This application claims priority to U.S. Provisional Application No. 62/297,094, filed on Feb. 18, 2016. The disclosure of the prior application is considered part of and is incorporated by reference in the disclosure of this application.

BACKGROUND

This specification relates to training latent variable machine learning models.

Some machine learning models are latent variable models that generate a model output by first determining a respective value for each of multiple latent variables and then determining the model output from the determined latent variable values.

For example, some of these machine learning models determine values of latent variables that represent features of an image and then generate an image using the determined values.

Some of these machine learning models use one or more neural networks to determine the latent variable values and to then determine the model output.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for training a latent variable machine learning model. In particular, for each training observation in a set of training data, a system determines a plurality of latent variable value configurations and determines, for each of the plurality of latent variable value configurations, a respective local learning signal. Each latent variable value configuration is a combination of latent variable values that includes a respective value for each of the latent variables and the respective local learning signal for each of the configurations is minimally dependent on each of the other latent variable value configurations in the plurality of latent variable value configurations. The system then determines an unbiased estimate of a gradient of the objective function using the local learning signals and updates current values of the parameters of the model using the unbiased estimate of the gradient.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. By training a latent variable model as described in this specification, the per-training-example learning signals will have a low variance without requiring learning any additional parameters during the training. This increases the quality, i.e., improves the performance, of the trained model without unduly increasing the computational resources required to train the model. The latent variable model training techniques described in this specification can be used to effectively train a model that includes multiple latent variables with some or all of them being discrete variables using a multi-sample approach. By using the unbiased gradient estimates described in this specification during training, latent variable models that have discrete latent variables can be readily integrated into larger systems that can be trained end-to-end.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
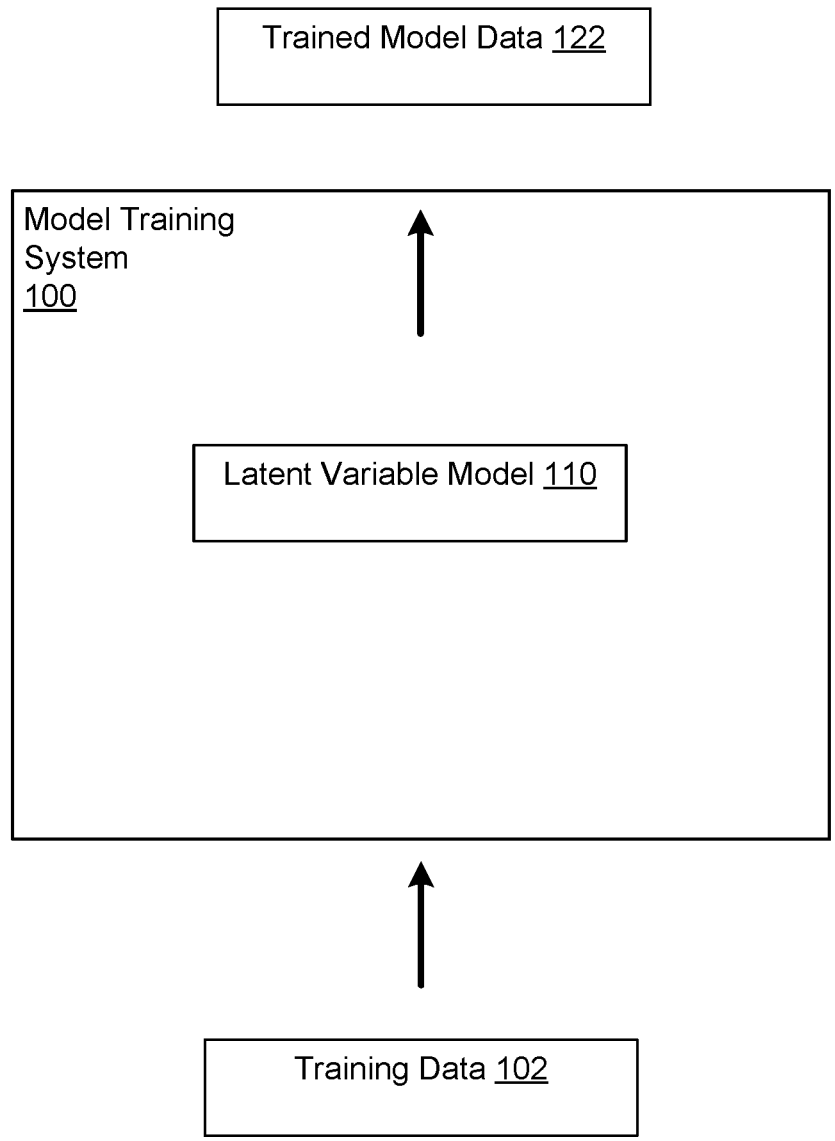
FIG. 1 shows an example model training system.

FIG. 1 shows an example model training system 100. The model training system 100 is an example of a system implemented as computer programs on one or more computers in one or more locations, in which the systems, components, and techniques described below can be implemented.

The model training system 100 is a system that receives training data 102 and uses the training data 102 to train a latent variable model 110 to determine output data 122 that specifies trained values of the parameters of the latent variable model 110.

The latent variable model 110 is a machine learning model having a plurality of parameters that is configured to determine a model output by determining a respective value for each of a plurality of latent variables and then determining the model output from the determined latent variable values.

In particular, the latent variable model 110 is configured to generate distribution parameters, e.g., means and, optionally, standard deviations or variances, of a multivariate distribution over possible values for the latent variables, i.e., a distribution that includes a respective dimension for each latent variable. Examples of distributions that can be used for each dimension of the multivariate distribution include Gaussian distribution, Bernoulli distributions, and so on. In some cases, different dimensions of the multivariate distribution can be different and can therefore be defined by different distribution parameters.

The latent variable model 110 is then configured to sample a respective value for each latent variable from the multivariate distribution in accordance with the distribution parameters, i.e., by sampling each value from the dimension of the multivariate distribution corresponding to the latent variable.

In some implementations, some or all of the latent variables are discrete variables, i.e., variables that can only take on a finite number of values. For example, some or all of the latent variables can be binary variables that can only take on one of two values, e.g., either zero or one. In these implementations, the latent variable model 110 is constrained to sample only valid values for those latent variables that are discrete.

In some implementations, the latent variable model 110 includes one neural network that is configured to generate the distribution parameters in accordance with current values of one set of network parameters and another neural network that is configured to generate the model output from the values of the latent variables in accordance with current values of another set of network parameters.

The latent variable model 110 can be configured to perform any of a variety of machine learning tasks.

For example, the latent variable model 110 can be configured to autoencode input observations, e.g., input images or sequences of text. In these implementations, the latent variable model 110 generates the distribution parameters by processing the input observation and then generates a reconstruction of the input observation from the latent variables. Generally, the latent variable values represent features of the input observation and, therefore, of the reconstruction. In these implementations, once trained, the latent variable model 110 can be used to generate new observations by randomly or otherwise sampling values of the latent variables without conditioning the values on an input observation.

As another example, the latent variable model 110 can be configured to perform a structured prediction task. In such a task, the latent variable model 110 receives context data and generates an output observation conditioned on the context data. For example, the latent variable model 110 can receive an incomplete portion of an image and can generate an output image that includes the missing portions of the image, e.g., can reconstruct the bottom half of an image from the top half of the image. In these examples, the latent variable model 110 processes the context to generate the distribution parameters and then processes the latent variable values to generate the output observation.

The model training system 100 trains the latent variable model 110 on the training data 102 to determine trained values of the parameters of the latent variable model 110, i.e., trained values of the parameters that are used in determining the distribution parameters and of the parameters that are used in determining the model output from the latent variable values.

In particular, for each training observation in the training data 102, the model training system 100 determines multiple latent variable value configurations, determines a respective local learning signal for each of the multiple latent variable value configurations, and uses the local learning signals to determine an unbiased estimator of the gradient of an objective function for the training observation. The model training system 100 then adjusts the current values of the parameters using the unbiased estimator.

Training the latent variable model 110 is described in more detail below with reference to FIGS. 2 and 3.

The output data 122 specifies the trained values of the parameters of the model. Once generated, the model training system 100 can store the output data 122 for use in generating model outputs using the latent variable model 110, can transmit the output data 122 to another system for use in instantiating a trained instance of the latent variable model 110, or both. Alternatively, the model training system 100 can directly use the trained latent variable model to generate model outputs.

Figure 2:
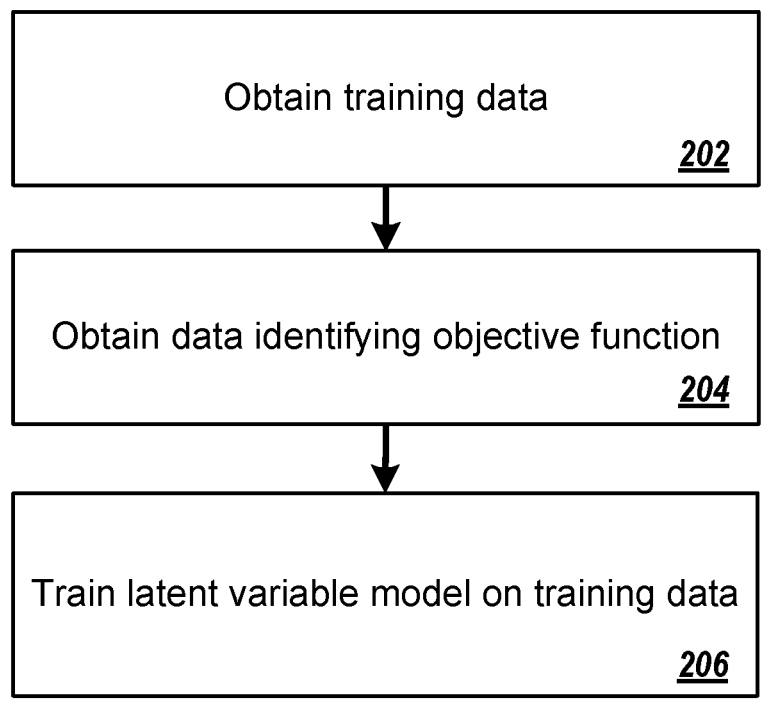
FIG. 2 is a flow chart of an example process for training a latent variable model.

FIG. 2 is a flow chart of an example process 200 for training a latent variable model. For convenience, the process 200 will be described as being performed by a system of one or more computers located in one or more locations. For example, a model training system, e.g., the model training system 100 of FIG. 1, appropriately programmed in accordance with this specification, can perform the process 200.

The system obtains training data for training the latent variable model (step 202). The training data includes a set of training observations and, optionally, context for each training observation. Generally, each training observation is a model output that should be generated by the latent variable model.

For example, when the latent variable model is being trained to reconstruct input observations, e.g., input images, each training observation is an image to be reconstructed by the latent variable model.

As another example, when the latent variable model is being trained to perform a structured output task in which the latent variable model generates an output observation from a context input, each training observation is an observation that should be generated by the latent variable model given the context for the training observation.

The system obtains data identifying an objective function for training the latent variable model (step 204). The objective function measures, for each training observation, how well the latent variables generated by the latent variable model for the training observation explain the training observation. In particular, the objective function is a multi-sample objective, i.e., determining the value of the objective function for a given training observation requires sampling a predetermined number greater than one (K) latent variable value configurations and then determining how well the latent variable values in each of those configurations explain the training observation. As will be described in more detail below, a latent variable value configuration is a combination of latent variable values that includes a respective value for each of the latent variables.

For example, the objective function, which will also be referred to as the global learning signal, can satisfy:

$$\hat{L}(h^{1:K}) = \log\frac{1}{K}(\Sigma_i f(x, h^i)).$$

where $h^i$ is the i-th latent variable value configuration, i ranges over all K configurations, and $f(x,h^i)$ is a function of the training observation x and the latent variable configuration $h^i$. In particular, $f$ is a function that measures how well the latent variable configuration explains the training observation.

In some implementations, $f(x,h^i)$ is the probability of the training observation given the latent variable configuration as generated by the portion of the model that generates the model output from the latent variable values. In some other implementations, $f(x,h^i)$ satisfies:

$$f(x, h^i) = \frac{p(x, h^i)}{q(h^i \mid x)},$$

where p(x,h$^i$) measures how well the latent configuration h$^i$ explains the observation x under the model, and q(h$^i$|x) is the probability of configuration h$^i$ according to the multivariate distribution parameterized by the distribution parameters generated by the model by processing the observation x.

In some cases, p(x,h$^i$)=p(x|h$^i$)=p(h$^i$), where p(x|h$^i$) is the probability of the training observation given the latent variable configuration as generated by the portion of the model that generates the model output from the latent variable values, and p(h$^i$) is the probability of the configuration h$^i$ according to a prior distribution over latent variable configurations. The prior distribution may also be parameterized by the output of a neural network that is part of the latent variable model.

The system trains the latent variable model on the training data by adjusting the values of the parameters of the latent variable model to optimize the objective function (step 206).

In particular, for each training observation in the training data, the system determines multiple latent variable value configurations, determines a respective local learning signal for each of the multiple latent variable value configuration, and uses the local learning signals to determine an unbiased estimator of the gradient of the objective function for the training observation. The system then adjusts the current values of the parameters using the unbiased estimator. That is, the system performs an iteration of training procedure for each training observation to determine trained values of the parameters of the latent variable model from initial values of the parameters. Performing an iteration of a training procedure is described below with reference to FIG. 3.

Figure 3:
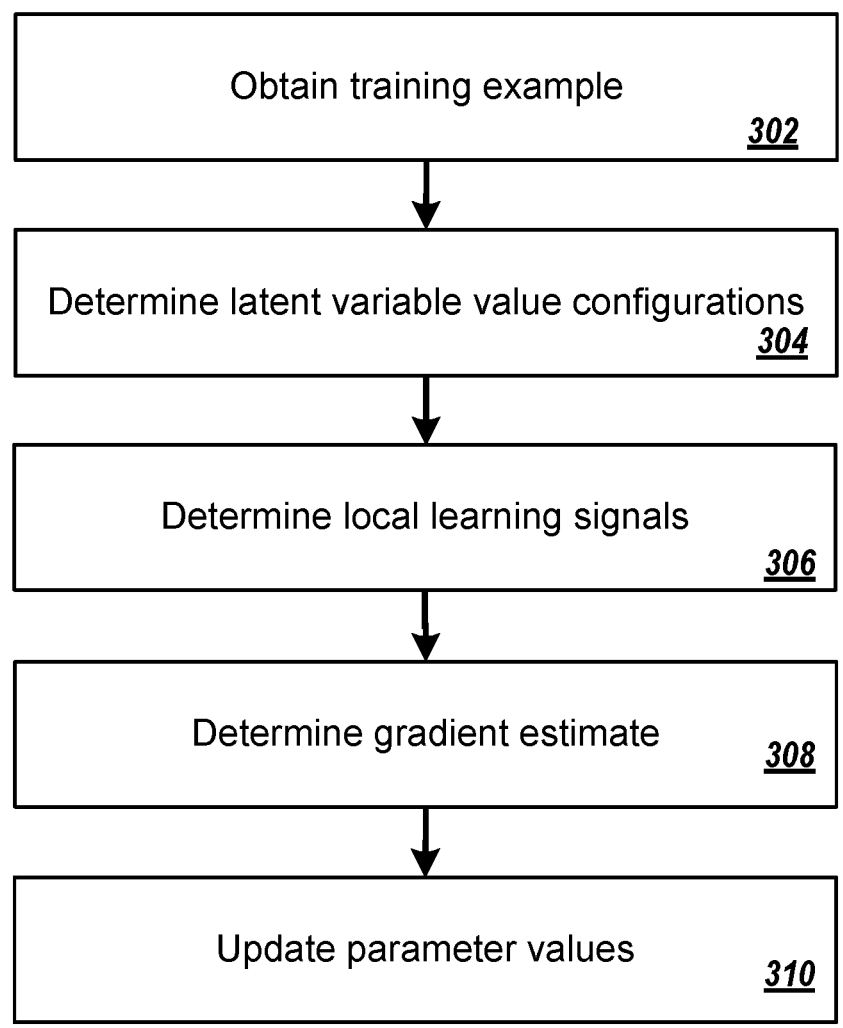
FIG. 3 is a flow chart of an example process for performing an iteration of a training procedure.

FIG. 3 is a flow chart of an example process 300 for performing an iteration of a training procedure for a training observation. For convenience, the process 300 will be described as being performed by a system of one or more computers located in one or more locations. For example, a model training system, e.g., the model training system 100 of FIG. 1, appropriately programmed in accordance with this specification, can perform the process 300.

The system obtains a training observation (step 302). For example, the system can sample a training observation randomly from the training data being used to train the model.

The system determines a plurality of latent variable value configurations for the training observation (step 304). Each latent variable value configuration is a combination of latent variable values that includes a respective value for each of the latent variables. Generally, the number K of latent variable value configurations that the system determines is predetermined and is the same for all of the training observations used to train the model. For example, the number can be two, five, ten, or fifty.

The system determines the latent variable value configurations by, for each of the latent variable value configurations, selecting the latent variable values in the latent variable value configuration by sampling from a multivariate distribution over possible values for the latent variables.

The multivariate distribution is defined by distribution parameters that are generated by the latent variable model.

As described above, the manner in which the latent variable model generates the distribution parameters is dependent on the task that the model is configured to perform. For example, when the model is configured to reconstruct input observations, the model generates the distribution parameters by processing the training observation. As another example, when the model is configured to perform a structured prediction task that involves generating an output observation based on a context, the model generates the distribution parameters by processing the context and, optionally, the training observation. Depending on the objective function and the configuration of the model, the model may also generate an output that parameterizes the prior distribution, i.e., either from a placeholder input or from the context.

The system determines a respective local learning signal for each of the latent variable value configurations (step 306). In particular, each local learning signal is minimally dependent on each of the other latent variable value configurations determined for the training observation. That is, each local learning signal measures how well the corresponding latent variable value configuration explains the training observation with minimal impact from the other latent variable value configurations.

In particular, in some implementations, the local learning signal $\hat{L}(h^j \mid h^{-j})$ for latent variable value configuration h$^i$ satisfies:

$$\hat{L}(h^j \mid h^{-j}) = \hat{L}(h^{1:K}) - \log \frac{1}{K}\left( \sum_{i \neq j} f(x, h^i) + \hat{f}(x, h^j) \right),$$

where K is the total number of configurations, the sum is the sum over all of the configurations except the j-th configuration, i.e., i ranges to cover all of the configurations except for the j-th configuration, $\hat{f}$ is the mean, e.g., the arithmetic or geometric mean, of the values of $f$ for all of the configurations except the j-th configuration, and $\hat{L}(h^{1:K})$ is the global learning signal described above that satisfies:

$$\hat{L}(h^{1:K}) = \log \frac{1}{K}\left( \sum_{i} f(x, h^i) \right).$$

The system determines an unbiased estimate of the gradient of the objective function using the local learning signals (step 308).

In particular, the unbiased estimate can satisfy:

$$\Sigma_j \hat{L}(h^j \mid h^{-j}) \nabla_\theta \log Q(h^j \mid x) + \Sigma_j \tilde{w}^j \nabla_\theta \log f(x,h^j),$$

where Q(h$^j$|x) is the multivariate distribution from which the configurations are sampled and $\tilde{w}^j$ is equal to the value of $f$ for the j-th configuration divided by the sum of the values of $f$ for all of the configurations.

The system updates the current values of the parameters of the latent variable model using the unbiased estimate of the gradient (step 310). For example, the system can add the gradient for each parameter value, optionally after multiplying the gradient by a learning rate for the parameter value, to the current value of the parameter value to determine an updated value for the parameter.

To train the latent variable model, the system can repeatedly perform the process 300 until each training observation in the training data has been sampled, until the updates to the parameter values are below a threshold value, or until some other termination criteria have been satisfied.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a machine learning model having a plurality of parameters on a plurality of training observations by optimizing an objective function, wherein the machine learning model is configured to determine a model output by determining a respective value for each of a plurality of latent variables and determining the model output from the determined latent variable values, the method comprising, for each of the plurality of training observations:

generating a distribution over possible values for the plurality of latent variables by processing the training observation; and sampling from the distribution a plurality of times to generate a plurality of latent variable value configurations for the training observation, each latent variable value configuration being a combination of latent variable values that includes a respective value for each of the latent variables;

determining, for each of the plurality of latent variable value configurations, a respective local learning signal that measures how well the corresponding latent variable value configuration explains the training observation with minimal impact from the other latent variable value configurations, wherein the local learning signal $\hat{L}(h^j|h^{-j})$ for a latent variable value configuration $h^j$ satisfies:

$$\hat{L}(h^j|h^{-j}) = \hat{L}(h^{1:K}) - \log\frac{1}{K}\left(\sum_{i \neq j} f(x, h^i) + \hat{f}(x, h^j)\right),$$

where $h^j$ is the j-th latent variable value configuration, K is the total number of configurations, i ranges to cover all of the configurations except for the j-th configuration, x is the training observation, $f$ is a function of the training observation x and a latent variable configuration, $\hat{f}$ is the mean of the values of $f$ for all of the configurations except the j-th configuration, and $\hat{L}(h^{1:K})$ is a global learning signal;

determining an unbiased estimate of a gradient of the objective function using the local learning signals; and updating current values of the parameters of the machine learning model using the unbiased estimate of the gradient.

2. The method of claim 1, wherein at least one of the latent variables is a discrete latent variable.

3. The method of claim 1, wherein the distribution is a multivariate distribution and wherein the machine learning model is further configured to:

determine the respective value for each of the latent variables by sampling from the multivariate distribution over possible values for the latent variables.

4. The method of claim 3, wherein determining the plurality of latent variable value configurations comprises, for each latent variable value configuration:

selecting the latent variable values in the latent variable value configuration by sampling from the multivariate distribution.

5. The method of claim 3, wherein the machine learning model is further configured to:

process the training observation, a context for the training observation, or both to determine parameters for the multivariate distribution.

6. The method of claim 3, wherein the unbiased gradient estimate satisfies:

$$\Sigma_j \hat{L}(h^j|h^{-j}) \nabla \log Q(h^j|x) + \Sigma_j \tilde{w}^j \nabla \log f(x, h^j)$$

where $h^j$ is the j-th latent variable value configuration, $\hat{L}(h^j|h^{-j})$ is a local learning signal for the latent variable value configuration $h^j$, $f$ is a function of the training observation x and a latent variable configuration, $\hat{f}$ is the mean of the values of $f$ for all of the configurations except the j-th configuration, $Q(h^j|x)$ is the multivariate distribution from which the configurations are sampled and $\tilde{w}^j$ is equal to the value of $f$ for the j-th configuration divided by the sum of the values of $f$ for all of the configurations.

7. The method of claim 1, wherein $\hat{L}(h^{1:K})$ satisfies:

$$\hat{L}(h^{1:K}) = \log\frac{1}{K}\left(\sum_i f(x, h^i)\right).$$

8. The method of claim 1, wherein $f$ is a function that measures how well an input latent variable value configuration explains an input observation.

9. The method of claim 1, wherein the machine learning model comprises a first neural network configured to generate the model output from the values of the latent variables.

10. The method of claim 9, wherein the machine learning model comprises a second neural network configured to process the training observation to generate an output that defines the parameters of the distribution over possible values for the latent variables.

11. The method of claim 1, wherein the model output is an image.

12. The method of claim 11, wherein each of the latent variables represents a feature of the image.

13. The method of claim 1, wherein the function $f(x,h^i)$ satisfies:

$$f(x, h^i) = \frac{p(x, h^i)}{q(h^i \mid x)},$$

where $p(x,h^i)$ measures how well the latent variable configuration $h^i$ explains the training observation x under the machine learning model, and $q(h^i|x)$ is the probability of latent variable configuration $h^i$ according to a multi-variate distribution parameterized by distribution parameters generated by the machine learning model by processing the training observation x.

14. A system comprising one or more computers and one or more storage devices storing instructions that when executed by the one or more computers cause the one or more computers to perform operations for training a machine learning model having a plurality of parameters on a plurality of training observations by optimizing an objective function, wherein the machine learning model is configured to determine a model output by determining a respective value for each of a plurality of latent variables and determining the model output from the determined latent variable values, the method comprising, for each training observation:
generating a distribution over possible values for the plurality of latent variables by processing the training observation; and
sampling from the distribution a plurality of times to generate a plurality of latent variable value configurations for the training observation, each latent variable value configuration being a combination of latent variable values that includes a respective value for each of the latent variables;
determining, for each of the plurality of latent variable value configurations, a respective local learning signal that measures how well the corresponding latent variable value configuration explains the training observation with minimal impact from the other latent variable value configurations, wherein the local learning signal $\hat{L}(h^j|h^{-j})$ for a latent variable value configuration $h^j$ satisfies:

$$\hat{L}(h^j \mid h^{-j}) = \hat{L}(h^{1:K}) - \log\frac{1}{K}\left(\sum_{i \neq j} f(x, h^i) + \hat{f}(x, h^j)\right),$$

where $h^j$ is the j-th latent variable value configuration, K is the total number of configurations, i ranges to cover all of the configurations except for the j-th configuration, x is the training observation, $f$ is a function of the training observation x and a latent variable configuration, $\hat{f}$ is the mean of the values of $f$ for all of the configurations except the j-th configuration, and $\hat{L}(h^{1:K})$ is a global learning signal;
determining an unbiased estimate of a gradient of the objective function using the local learning signals; and
updating current values of the parameters of the machine learning model using the unbiased estimate of the gradient.

15. The system of claim 14, wherein the distribution is a multivariate distribution and wherein the machine learning model is further configured to:
determine the respective value for each of the latent variables by sampling from the multivariate distribution over possible values for the latent variables.

16. The system of claim 15, wherein determining the plurality of latent variable value configurations comprises, for each latent variable value configuration:
selecting the latent variable values in the latent variable value configuration by sampling from the multivariate distribution.

17. The system of claim 15, wherein the machine learning model is further configured to:
process the training observation, a context for the training observation, or both to determine parameters for the multivariate distribution.

18. The system of claim 14, wherein $\hat{L}(h^{1:K})$ satisfies:

$$\hat{L}(h^{1:K}) = \log\frac{1}{K}\left(\sum_i f(x, h^i)\right).$$

19. One or more non-transitory computer storage media storing instructions that when executed by one or more computers cause the one or more computers to perform operations for training a machine learning model having a plurality of parameters on a plurality of training observations by optimizing an objective function, wherein the machine learning model is configured to determine a model output by determining a respective value for each of a plurality of latent variables and determining the model output from the determined latent variable values, the method comprising, for each training observation:
generating a distribution over possible values for the plurality of latent variables by processing the training observation; and
sampling from the distribution a plurality of times to generate a plurality of latent variable value configurations for the training observation, each latent variable value configuration being a combination of latent variable values that includes a respective value for each of the latent variables;
determining, for each of the plurality of latent variable value configurations, a respective local learning signal that measures how well the corresponding latent variable value configuration explains the training observation with minimal impact from the other latent variable value configurations, wherein the local learning signal $\hat{L}(h^j|h^{-j})$ for a latent variable value configuration $h^j$ satisfies:

$$\hat{L}(h^j \mid h^{-j}) = \hat{L}(h^{1:K}) - \log\frac{1}{K}\left(\sum_{i \neq j} f(x, h^i) + \hat{f}(x, h^j)\right),$$

where $h^j$ is the j-th latent variable value configuration, K is the total number of configurations, i ranges to cover all of the configurations except for the j-th configuration, x is the training observation, $f$ is a function of the training observation x and a latent variable configuration, $\hat{f}$ is the mean of the values of $f$ for all of the configurations except the j-th configuration, and $\hat{L}(h^{1:K})$ is a global learning signal;

determining an unbiased estimate of a gradient of the objective function using the local learning signals; and updating current values of the parameters of the machine learning model using the unbiased estimate of the gradient.

20. The system of claim 14, wherein the function $f(x,h^i)$ satisfies:

$$f(x, h^i) = \frac{p(x, h^i)}{q(h^i \mid x)},$$

where $p(x,h^i)$ measures how well the latent variable configuration $h^i$ explains the training observation x under the machine learning model, and $q(h^i|x)$ is the probability of latent variable configuration $h^i$ according to a multi-variate distribution parameterized by distribution parameters generated by the machine learning model by processing the training observation x.

\* \* \* \* \*